United States Patent [19]
Goto

[11] Patent Number: 5,475,828
[45] Date of Patent: Dec. 12, 1995

[54] DIGITAL PROCESSOR HAVING PLURALITY OF MEMORIES AND PLURALITY OF ARITHMETIC LOGIC UNITS CORRESPONDING IN NUMBER THERETO AND METHOD FOR CONTROLLING THE SAME

[75] Inventor: Junichi Goto, Tokyo, Japan

[73] Assignee: NEC Corporation, Tokyo, Japan

[21] Appl. No.: 976,924

[22] Filed: Nov. 16, 1992

[30] Foreign Application Priority Data

Nov. 15, 1991 [JP] Japan .................................. 3-328214

[51] Int. Cl.$^6$ ................................................ G06F 12/02
[52] U.S. Cl. ................ 395/485; 364/244.8; 364/964.31; 364/DIG. 1; 395/375
[58] Field of Search ..................... 364/200 MS, 900 MS; 395/400 MS, 425 MS

[56] References Cited

U.S. PATENT DOCUMENTS 4,862,407  8/1989  Fette et al. ................................ 395/800
5,045,993  9/1991  Murakami et al. ...................... 395/425
5,155,852  10/1992  Murakami et al. ...................... 395/575
5,206,940  4/1993  Murakami et al. ...................... 395/400
5,253,346  10/1993  Okabayashi et al. ................... 395/325

OTHER PUBLICATIONS

P. Hampton et al., "Multiprocessor APs Simplify Calculations for Image Processing", Computer Technology Review, vol. 1, No. 3, 1986, pp. 41–45.
K. Kaneko et al., "A 50ns DSP With Parallel Processing Architecture"; 1987 IEEE Int. Conf. On Solid-State Circuits, Feb. 1987, pp. 158–159.

Primary Examiner—Reba I. Elmore
Attorney, Agent, or Firm—Whitham, Curtis, Whitham & McGinn

[57] ABSTRACT

In a digital processor having a plurality of memories and a plurality of ALUs, each of address ports of each of the memories is associated with an address generation circuit capable of executing a loop processing required for address generation. With this arrangement, it is possible to access a plurality of memories, and therefore, the processing efficiency is improved.

22 Claims, 5 Drawing Sheets

DIGITAL PROCESSOR HAVING PLURALITY OF MEMORIES AND PLURALITY OF ARITHMETIC LOGIC UNITS CORRESPONDING IN NUMBER THERETO AND METHOD FOR CONTROLLING THE SAME

BACKGROUND OF THE INVENTION

1. Field of the Invention

The present invention relates to a digital processor and a method for controlling the same, and more specifically to a digital signal processor having high performance, and a method for controlling the same.

2. Description of Related Art

In conventional digital processors, generation of addresses is based on an adding operation, and therefore, both of generation for a memory address and an arithmetic and logical operation of data have been performed in common by an arithmetic logic unit (ALU). However, this combined use has become a hindrance in increasing performance. In particular, in a digital signal processor (DSP) in which processings including many repeated processings, such as a sum-of-products operation indispensable for signal processings, are executed, it is important that the address generation is made independently of the arithmetic and logical operation of data, so that the processing is effectively performed.

Recently, Kaneko et al proposed a digital signal processor in "1987 IEEE International Solid-State Circuit Conference", "Digest of Technical Papers", February 1987, pp 158–159, published by IEEE. The proposed digital signal processor includes an address generation circuit composed of an addition circuit having one input connected to an output of an address register, whose input is connected to an output of the addition circuit itself. The other input of the addition circuit is connected to receive through a selector a fixed value "+1", an output of a first displacement register, or an output of a second displacement register. A selection signal for the selector is supplied from a controller within the processor at each operation clock period.

This type of address generation is important in an image processing in which each one pixel is stored at one individual address. Here, consider that a rectangular region is accessed by assuming that the memory has M(=16) pixels in a horizontal direction and N(=20) pixels in a vertical direction and the rectangular region has "m"(=3) pixels in a horizontal direction and "n"(=4) pixels in a vertical direction. If the rectangular region is accessed from an upper left corner, a first horizontal access from the upper left corner to an upper right corner of the rectangular region can be performed by adding "+1" to a current address stored in the address register. Therefore, the selector selects "+1". When the access is moved from the upper right corner to a left end of a second line of the rectangular region, a required address change is obtained by adding {M–(m–1)}(=14) to the current address. Therefore, this displacement value of "14" is previously registered in the first displacement register, and the selector selects this first displacement register. When the access reaches a lower right corner, the address is moved to return to the upper left corner. For this purpose, a required address change is obtained by subtracting {(n–1)M+(m–1)}(=50) from the current address. Therefore, this displacement value of "–50" is previously registered in the second displacement register, and the selector selects this second displacement register. Thus, a triple loop processing is performed.

For the loop processing, the number of loops and the end discrimination are described in a program, and the controller decodes the program at each step so as to supply a necessary selection signal to the selector.

In the above mentioned digital processor and the controlling method therefor, if the number of the memories to be accessed simultaneously becomes large, a corresponding number of selection signals must be simultaneously supplied. For elevation of the processing capacity of the processor, it can be sufficiently considered that a simultaneous access to a number of memories is required. However, a controller of many processors is configured so that a so-called horizontal microinstruction is read out at each operation clock period, and then decoded to generate various control signals including the selection signal, so that the various control signals are supplied to different parts of the processor. Therefore, in order to simultaneously supply a number of selection signals, it is necessary to elongate each one microinstruction, which means that it is required to increase the capacity of a microprogram memory storing the microinstructions. This will result in a decreased reading speed and in an increased cost.

In addition, in order to improve the operation clock period, it may become necessary to cause various circuits of the processor including the ALU to operate in a pipeline mode. In this case, because of the number of pipelined steps, the loop processing for generating an address for the memory supplying the data to the ALU and the loop processing for generating an address for the memory storing the result of the operation of the ALU must be executed with a time difference therebetween. However, the two loop processings (or more than two loop processings in some cases) having a time difference from each other cannot be controlled in the conventional manner in which one microinstruction is read out for each one clock period and decoded to perform a necessary processing.

SUMMARY OF THE INVENTION

Accordingly, it is an object of the present invention to provide a digital processor and a control method therefor, which have overcome the above mentioned defect of the conventional ones.

Another object of the present invention is to provide a digital processor and a control method therefor, which can perform a simultaneous access to a number of memories with high efficiency.

The above and other objects of the present invention are achieved in accordance with the present invention by a digital processor comprising a memory group composed of "m" memories, each memory "i" (i=1 to "m") of the "m" memories having $P_i$ address ports "ij" (j=1 to $P_i$), an arithmetic and logic unit group composed of "n" arithmetic and logic units, a first arbitration circuit receiving and arbitrating outputs of the memory group for outputting the arbitrated outputs of the memory group to the arithmetic and logic unit group, a second arbitration circuit receiving and arbitrating outputs of the arithmetic and logic unit group for outputting the arbitrated outputs of the arithmetic and logic unit group to the memory group, a plurality of address generation circuits each for supplying a generated address to the memory group, a clock supply circuit for supplying respective clock signals to at least the address generation circuits, and a control circuit supplying respective control signals to the memory group, the arithmetic and logic unit, the first arbitration circuit and the second arbitration circuit in synchronism with the clock signals generated by the clock supply circuit, the control circuit operating to previously set address generation rules to the address generation circuits so that the address generation circuits set with the address generation rules operate to generate an address in accordance with the set address generation rule and in synchronism with the clock supplied from the clock signal supply circuit, independently of the control circuit, and the set address generation rules are maintained effective until they are reset.

In one preferred embodiment, each one address generation circuit "ij" is connected to each one of the address ports "ij" in one-to-one relation. In addition, the address generation circuits "ij" are configured to supply a read enable signal or write enable signal to the memory "i".

In another preferred embodiment, the digital processor further includes an address arbitration circuit receiving the addresses generated by the address generation circuits each of which generates the address in accordance with the set address generation rule and in synchronism with the clock supplied from the clock signal supply circuit. The address arbitration circuit supplies the received addresses to a portion or all of the address ports "ij" in accordance with an address arbitration rule which set by the control circuit and which is maintained effective effective until it is reset. In addition, the address generation circuits "ij" are configured to supply a read enable signal or a write enable signal to the address arbitration circuit, and the address arbitration circuit supplies the received read enable signal or the received write enable signal to the portion or all of the address ports in accordance with the preset address arbitration rule.

Preferably, a portion or all of the arithmetic and logic units is configured to have one or more pipeline stages.

According to another aspect of the present invention, there is provided a method for controlling a digital processor which comprises a memory group composed of "m" memories, each memory "i" (i=1 to "m") of the "m" memories having $P_i$ address ports "i" (j=1 to $P_i$), an arithmetic and logic unit group composed of "n" arithmetic and logic units, a first arbitration circuit receiving and arbitrating outputs of the memory group for outputting the arbitrated outputs of the memory group to the arithmetic and logic unit group, a second arbitration circuit receiving and arbitrating outputs of the arithmetic and logic unit group for outputting the arbitrated outputs of the arithmetic and logic unit group to the memory group, a plurality of address generation circuits each for supplying a generated address to the memory group, a clock supply circuit for supplying respective clock signals to at least the address generation circuits, and a control circuit supplying respective control signals to the memory group, the arithmetic and logic unit, the first arbitration circuit and the second arbitration circuit in synchronism with the clock signals generated by the clock supply circuit, the control circuit operating to previously set address generation rules to the address generation circuits so that the address generation circuits set with the address generation rules operate to generate an address in accordance with the set address generation rule and in synchronism with the clock supplied from the clock signal supply circuit, independently of the control circuit, and the set address generation rules are maintained effective until they are reset, the method including the steps of selecting one or more of the address generation circuits, setting an address generation rule to each of the selected address generation circuits from the control circuit, supplying address generation start signals to the selected address generation circuits from the control circuit simultaneously or with a time difference so that each of the selected address generation circuits starts its address generation and continues to supply an address to a corresponding memory in synchronism with the clock and independently of the control circuit until the address generation indicated by the address generation rule is completed, each of the selected address generation circuits generating an address generation end signal when an address generation is ended, and a selected one of address generation end signals generated by the selected address generation circuits being supplied to the control circuit.

In one preferred embodiment, each one address generation circuit "ij" is connected to each one of the address ports "ij" in one-to-one relation. In addition, the address generation circuits "ij" are configured to supply a read enable signal or a write enable signal to the memory "i".

In another preferred embodiment, the digital processor further includes an address arbitration circuit receiving the addresses generated by the address generation circuits each of which generates the address in accordance with the set address generation rule and in synchronism with the clock supplied from the clock signal supply circuit. The address arbitration circuit supplies the received addresses to a portion or all of the address ports "ij" in accordance with the address arbitration rule which is set by the control circuit and which is maintained effective effective until it is reset. The address arbitration rule is set to the address arbitration circuit from the control circuit before the address generation rules are set, and each of the selected address generation circuits continues to supply an address to the address arbitration circuit in synchronism with the clock signal and independently of the control circuit until the address generation indicated by the address generation rule is completed, the address arbitration circuit continuing to the received address to the portion or all of the address ports in accordance with the address arbitration rule which is set by the control circuit and which is maintained effective until it is reset. In addition, the address generation circuits "ij" are configured to supply a read enable signal or a write enable signal to the address arbitration circuit, and the address arbitration circuit supplies the received read enable signal or the received write enable signal to the portion or all of the address ports in accordance with the preset address arbitration rule.

With the above mentioned arrangement, if one address generation circuit is provided in a one-to-one relation for each of address ports of each of all the memories, it becomes possible to simultaneously access a number of memories. Each of the address generation circuits is previously supplied from the control circuit with the address generation rule typified by the number of loops, etc., which are explained in the "Description of related art". In response to an address generation start signal supplied from the control circuit, each of the address generation circuits starts its address generation. Therefore, by simultaneously supplying the address generation start signals to a number of address generation circuits, it is possible to simultaneously access a number of memories. During execution of the address generation, each address generation circuit performs the counting of the loops and the discrimination of the loop end, which were described as a program in the prior art and which were decoded and executed by the control circuit.

In addition, in the case that the ALU performs a pipelined operation, the loop processing for generating an address for the memory supplying the data to the ALU and the loop processing for generating an address for the memory storing the result of the operation of the ALU must be executed with a time difference therebetween, because of the number of the pipelined steps. Also in this case, it is possible that after the address generation start signal is supplied to the address generation circuit for the data supplying memory, the address generation start signal is supplied to the address generation circuit for the operation result storing memory with a delay corresponding to the above mentioned time difference. If each of the address generation circuits performs the address generation of the number corresponding to the number of access designated by the control circuit, the address generation circuit supplies an address generation end signal to the control circuit. From the start of the address generation to the generation of the address generation end signal, the address generation circuit continues to generate the address independently of the control circuit.

The above and other objects, features and advantages of the present invention will be apparent from the following description of preferred embodiments of the invention with reference to the accompanying drawings.

DESCRIPTION OF THE PREFERRED EMBODIMENTS

Figure 1:
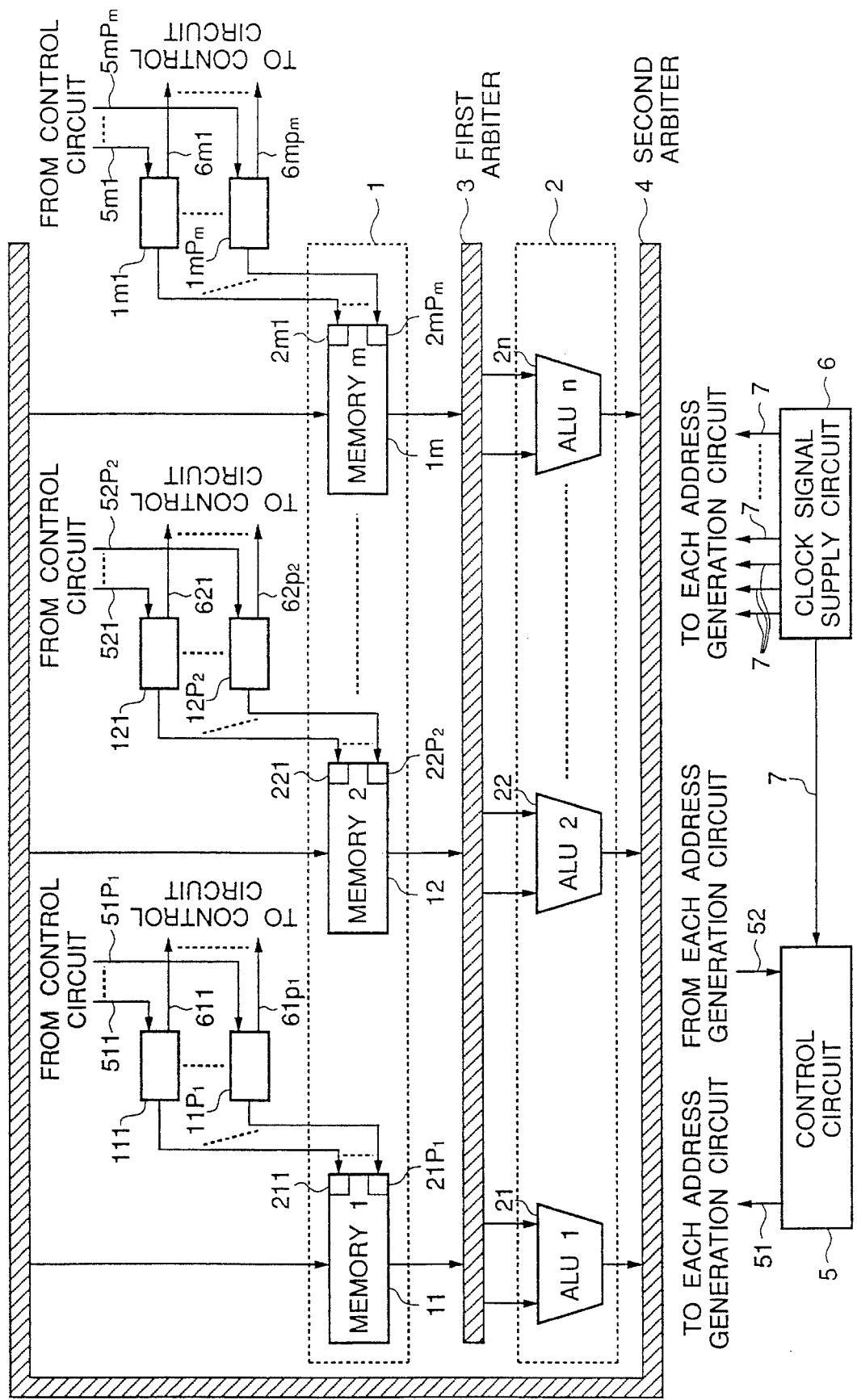
FIG. 1 is a block diagram of a first embodiment of the digital processor in accordance with the present invention.

Referring to FIG. 1, there is shown a block diagram of a first embodiment of the digital processor in accordance with the present invention.

The shown digital processor comprises a memory group 1 including a number of memories 11, 12, ..., 1m, which are labelled "MEMORY 1", MEMORY 2", ..., "MEMORY m". The memory 11 included $P_1$ address ports of "Address Port 211" to "Address Port 21$P_1$", and the memory 12 includes $P_2$ address ports of "Address Port 211" to "Address Port 22$P_2$". Similarly, the memory 1m includes $P_m$ address ports of "Address Port 2m1" to "Address Port 2m$P_m$". Each address port 2ij (i=1 to m, and j=1 to $P_i$) includes an address generation circuit "1ij". For example, the address port 211 includes an address generation circuit 111, and the address port 2m$P_m$ includes an address generation circuit 1m$P_m$. Each of the address ports 2ij is configured to receive a parameter signal through a signal line 5ij from a control circuit 5 and to output an address generation termination signal through a signal line 6ij to the control circuit 5. The control circuit 5 receives a clock signal from a clock signal supplies circuit 6, which also supply a clock signal to each of the address generation circuits.

The shown digital processor also includes an ALU group 2 composed of ALUs 21, 22, ..., 2n, which are labelled "ALU 1", "ALU 2", ..., "ALU n". As shown, outputs of the memory group 1 are supplied through a first arbiter 3 to the ALU group 2, and outputs of the ALU group 2 are supplied through a second arbiter 4 to the memory group 1. Therefore, the first arbiter 3 receives and arbitrates outputs of the memory group 1 for outputting the arbitrated outputs of the memory group 1 to the ALU group 2. Similarly, the second arbiter 4 receives and arbitrates outputs of the ALU group 2 for outputting the arbitrated outputs of the ALU group 2 to the memory group 1. In addition, the clock supply circuit 6 supplies respective clock signals to not only the address generation circuits but also the other circuits as shown. The control circuit 5 also supplies respective control signals to the memory group, the arithmetic and logic unit, the first arbitration circuit and the second arbitration circuit in synchronism with the clock signals generated by the clock supply circuit 6.

Now, operation of the first embodiment will be described with reference to the flow chart of FIG. 2.

Figure 2:
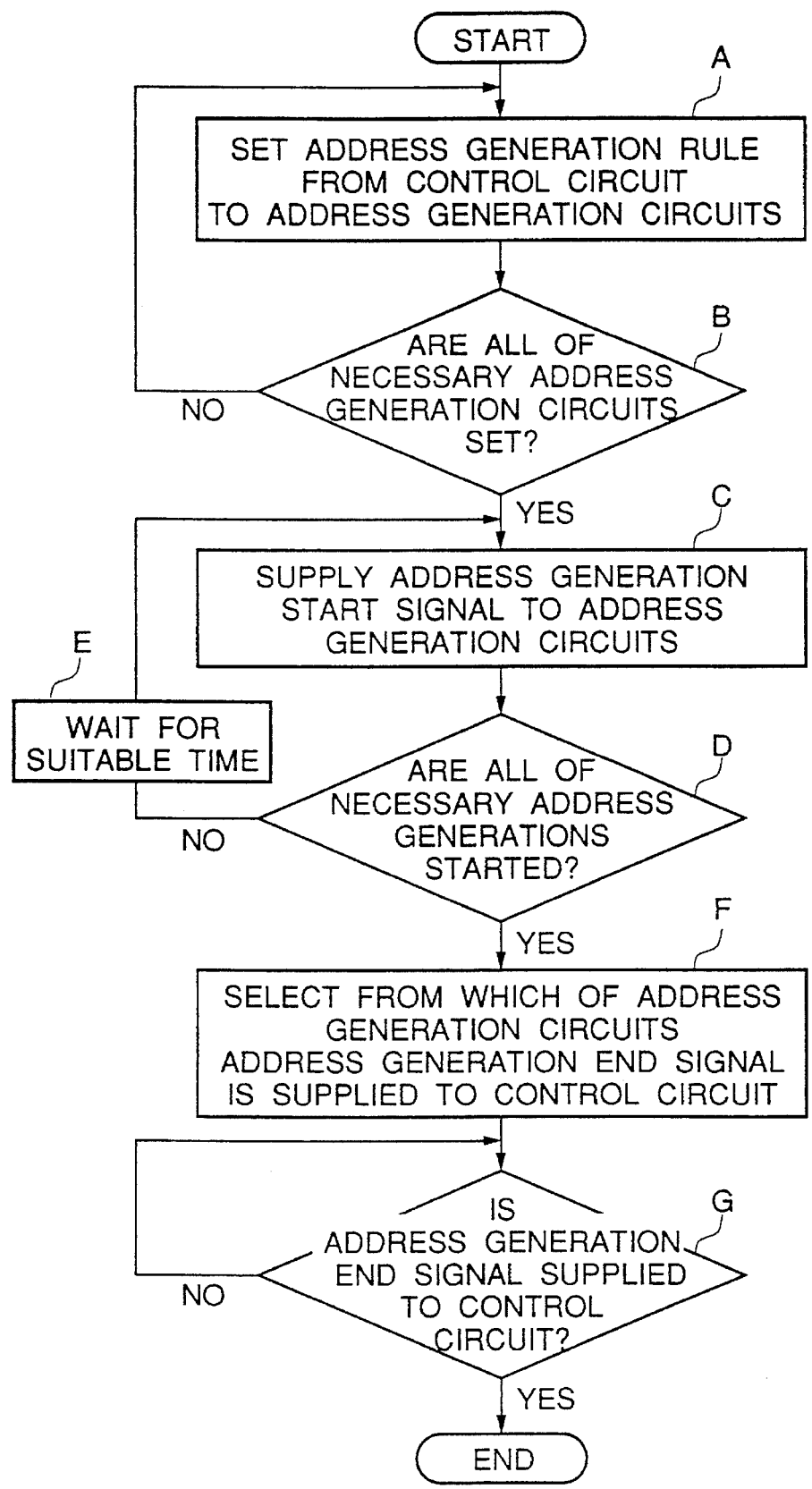
FIG. 2 is a flow chart illustrating an operation of the first embodiment shown in FIG. 1.

Steps A and B shown in the flow chart of FIG. 2 correspond to an operation for sequentially setting an individual address generation rule to each of one or more address generation circuits desired to generate an address.

Figure 5A:
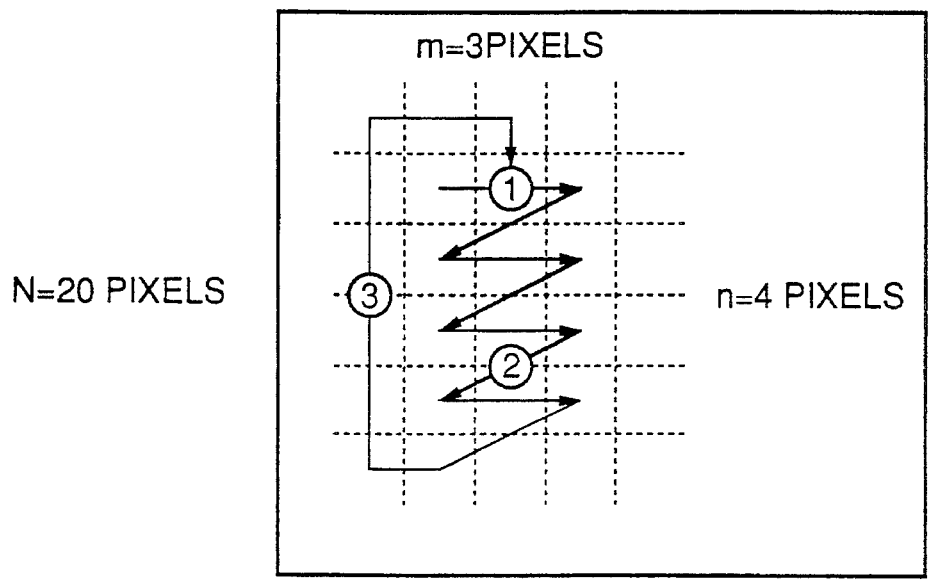
FIGS. 5A and 5B illustrate an example of a rectangular memory and a rectangular region within the rectangular memory, and steps for performing the triple loop operation, respectively.
Figure 5B:
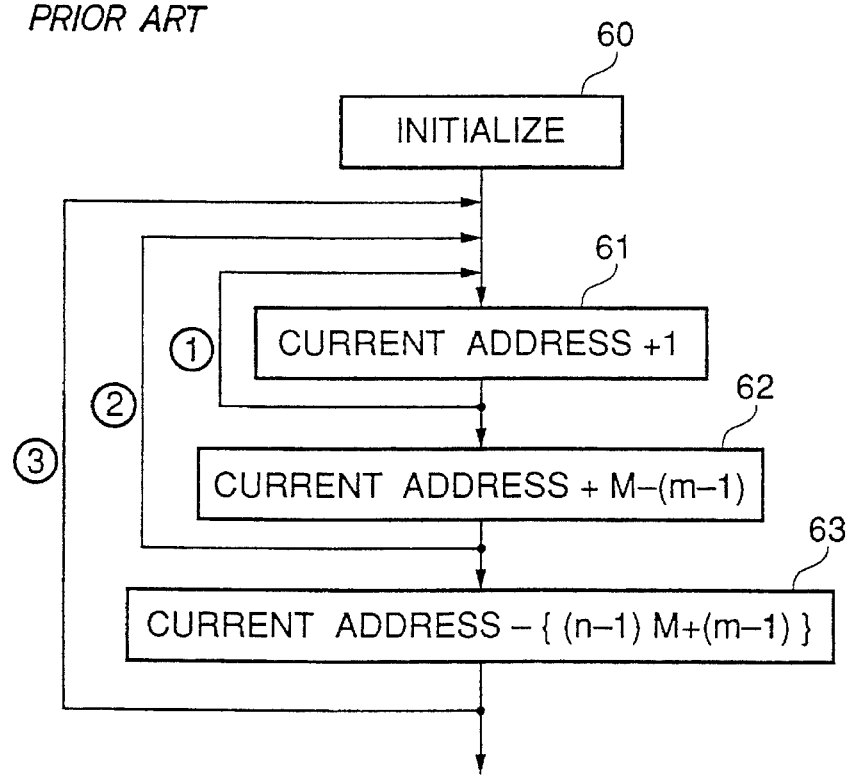

Here, referring to FIG. 5A and 5B, the triple loop as mentioned hereinbefore will be explained. FIG. 5A illustrates a rectangular memory having M(=16) pixels in a horizontal direction and N(=20) pixels in a vertical direction. Within this memory, a rectangular region is set, which has "m"(=3) pixels in a horizontal direction and "n"(=4) pixels in a vertical direction. If the rectangular region is accessed from an upper left corner, a first horizontal access designated by the arrow ① from the upper left corner to an upper right corner of the rectangular region can be performed by adding "+1" to a current address stored in an address register. When the access is moved from the upper right corner to a left end of a second line of the rectangular region as shown by an arrow ②, a required address change is obtained by adding {M−(m−1)} (=14) to the current address. Therefore, this displacement value of "14" is previously registered. When the access reaches to a lower right corner, the access returns to the upper left corner as shown by an arrow ③. For this purpose, a required address change is obtained by subtracting {(n−1)M+(M−1)} (=50) from the current address. Therefore, this displacement value of "−50" is previously registered. Thus, a triple loop processing is performed as shown in FIG. 5B.

Turning to FIGS. 1 and 2, in the case of performing the access in the triple loop as mentioned hereinbefore and just explained with reference to FIGS. 5A and 5B, the address generation rule means parameters such as an initial address, three loop numbers and two displacement values (in this case, one displacement value is fixed to "+1"). In this connection, one way can be considered, in which the parameters are stored in a bit pattern in the microinstruction, and read out by the control circuit so that these parameters are supplied to each of the address generation circuits. Here, assuming that the address generation circuit(s) desired to be set are designated by "ij", the parameters are supplied from the control circuit 5 through a signal line 51 and the signal line 5ij. Therefore, each of the signal lines 51 and 5ij is preferred to be a parallel bit signal bus of for example 16 bits or 32 bits. If the signal lines 51 and 5ij are coupled by a selector or a bus, the parameter can be supplied to a destination address generator by switching over the selector or the bus. This operation is repeated in a required number, namely, the number corresponding to the number of the address generation circuits desired to be set with the address generation rule.

The succeeding steps C, D and E are to supply an address generation start signal to the address generation circuits set with the address generation rule. This address generation start signal can be expressed in one bit. For example, the address generation start signal is normally of "0", and when it becomes "1", it means the address generation is starting. As mentioned above, since the address generation start signal can be expressed in one bit, it is easy to store a number of address generation start signals in the microinstruction, and therefore, it is possible to simultaneously bring a plurality of address generation circuits into an address generation starting condition. In FIG. 1, each of the signal lines 51 and 5ij includes a signal line for this one bit signal In the pipelined operation, in the case that the generation of an address for a memory for supplying data to the pipeline-operating ALU and the generation of an address for a memory for storing the result of the operation of the ALU are performed independently, the address generation start signal is first supplied to the address generation circuit for the former, and then, after a delay of clock periods of the number corresponding to the number of pipelined stages, the address generation start signal is supplied to the address generation circuit for the latter.

Thereafter, the address generation is executed by each address generation circuit independently of the control circuit 5, until the triple loop processing defined by the address generation rule is completed. When the address generation ends, each of the address generation circuits generates a one-bit address generation end signal, which is "0" during the address generation but becomes "1" after the address generation ends, for example.

On the other hand, after the address generation start signal has been supplied, the control circuit 5 is brought into a wait condition, by the fact that the loop is executed by a conditional jump instruction which is flagged with the address generation end signal. The address generation end signal to be used as the flag is one selected from a plurality of address generation end signals. For example, the address generation end signal to be used as the flag is the address generation end signal generated by the address generation circuit for the memory storing the result of the operation of the ALU. In FIG. 1, the address generation end signal is supplied through each signal line 6ij and also through the selector and the signal line 52 to the control circuit 5. This selection processing of the selector is shown in the step F of FIG. 2. If it is constructed that the selector is effective until the select signal is reset (it is also possible to store the select signal in a register), the processing in the step F can be performed before the address generation starting. In any case, the precessing of the step G is performed by a conditional jump flagged with one of the address generation end signals.

In the first embodiment, each of the address generation circuits "ij" can be configured to supply a read enable signal or a write enable signal to the associated memory "i".

Figure 3:
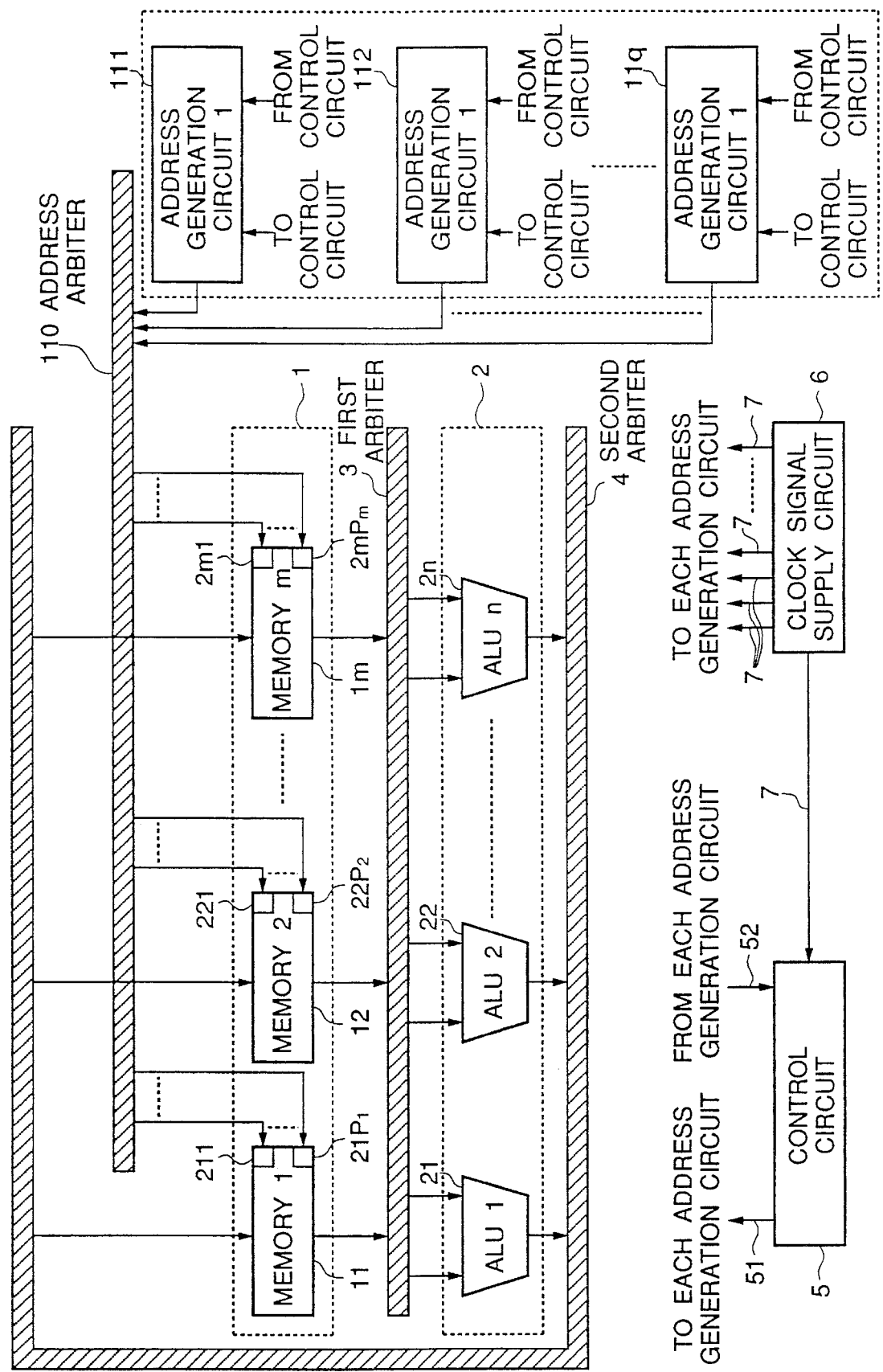
FIG. 3 is a block diagram of a second embodiment of the digital processor in accordance with the present invention.

Referring to FIG. 3, there is shown a block diagram of a second embodiment of the digital processor in accordance with the present invention. In FIG. 3, elements similar to those shown in FIG. 1 are given the same Reference Numerals, and explanation thereof will be omitted for simplification of the description.

The second embodiment is configured so that the number of address generation circuits is made smaller than the total number of all address ports of memories for the purpose of reducing the amount of hardware. The reason for this is that there is less necessity that all the memories are completely simultaneously operated.

Now, a portion of the second embodiment differing from the first embodiment is will be explained. The only feature of the second embodiment differing from the first embodiment is that the second embodiment is required to include means for determining which of the address generation circuits is selected and to which of the address ports an address generated by the selected address generation circuit should be supplied. This means is an address arbiter 110 shown in FIG. 3, which can be realized in the form of a selector or a bus structure. From which of the address generation circuits to which of the address ports an address should be supplied, namely, an address arbitration rule can be set by supplying a control signal from the control circuit to the address arbiter 110. If this control signal is stored in a register, the resetting can be made unnecessary until the address generation circuit terminates its address generation.

Figure 4:
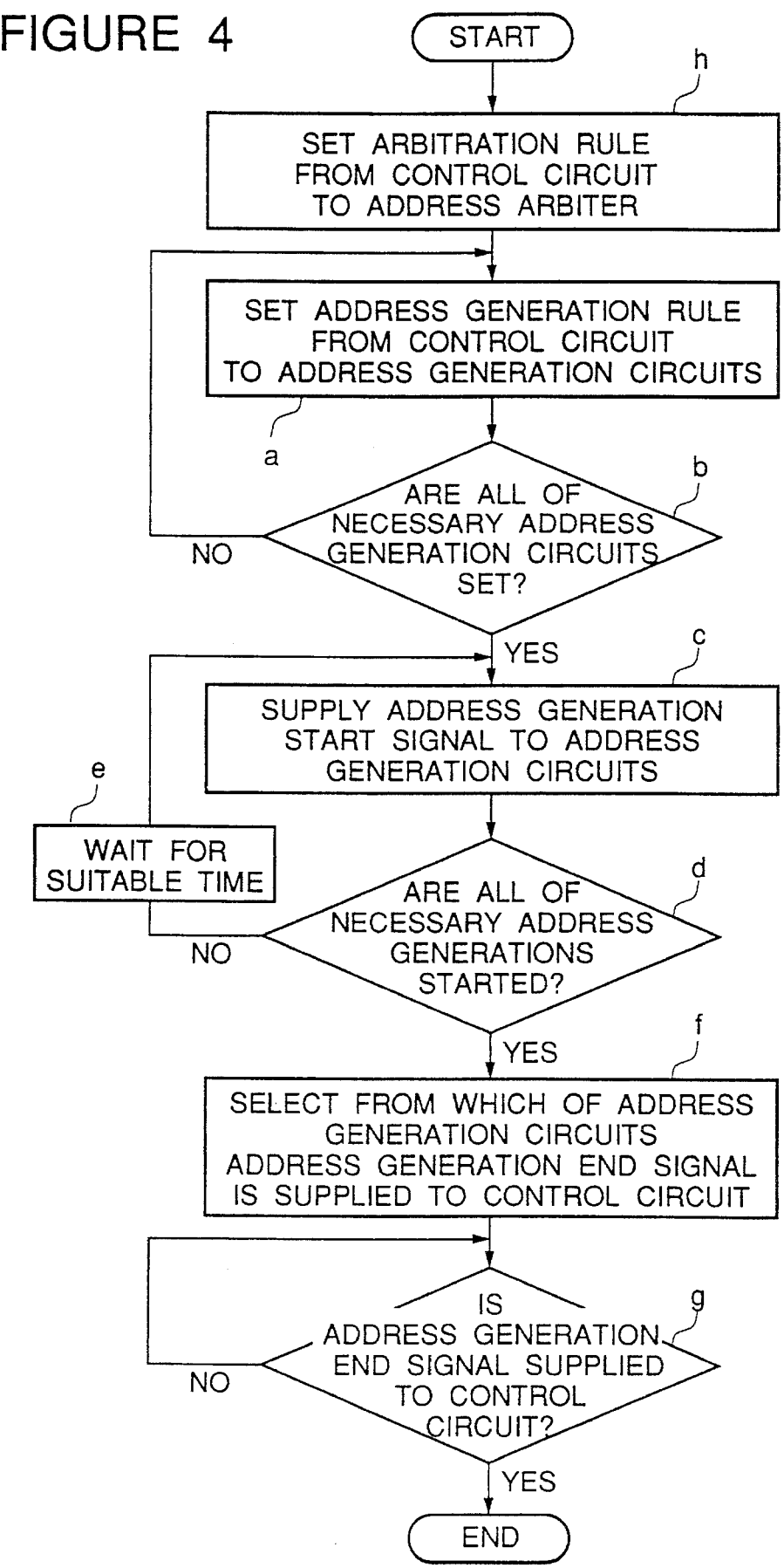
FIG. 4 is a flow chart illustrating an operation of the first embodiment shown in FIG. 3.

The flow chart of FIG. 4 illustrates an operation of the second embodiment. The steps "a" to "g" of FIG. 4 correspond to the steps "A" to "G" of FIG. 2, and therefore, explanation thereof will be omitted. In addition, the step "h" of FIG. 2 illustrates the setting of the address arbitration rule to the address arbiter 110.

In the second embodiment, each of the address generation circuits can be configured to supply a read enable signal or a write enable signal to the address arbitration circuit, and the address arbitration circuit can supply the received read enable signal or the received write enable signal to the portion or all of the address ports in accordance with the preset address arbitration rule.

As will be apparent from the above, the digital processor in accordance with the present invention having a plurality of memories and a plurality of ALUs is characterized in that each of address ports of each of the memories is associated with an address generation circuit capable of executing a loop processing required for address generation. With this arrangement, it is possible to access a plurality of memories, and therefore, processing having excellent efficiency can be realized.

In addition, it is not necessarily required that each of the address ports of each of the memories is associated with one address generation circuit. It is possible to distribute, by use of a selector of the like, addresses generated by a limited number of address generation circuits to memories which need an address. In this case, the amount of hardware can be reduced.

The invention has thus been shown and described with reference to the specific embodiments. However, it should be noted that the present invention is in no way limited to the details of the illustrated structures but changes and modifications may be made within the scope of the appended claims.

We claim:

1. A digital processor comprising:

a memory group comprising "m" memories, each memory "i" (i=1 to "m") of said "m" memories having Pi address ports "ij" (j=1 to Pi), an arithmetic and logic unit group comprising "n" arithmetic and logic units, first arbitration means for receiving and arbitrating outputs of said memory group and for outputting the arbitrated outputs of said memory group to said arithmetic and logic unit group, second arbitration means for receiving and arbitrating outputs of said arithmetic and logic unit group and for outputting the arbitrated outputs of said arithmetic and logic unit group to said memory group, a plurality of address generation means each for supplying a generated address to said memory group, clock supply means for supplying respective clock signals to at least said plurality of address generation means, and control means for supplying control signals to said memory group, said arithmetic and logic unit, said first arbitration means and said second arbitration means, respectively, in synchronism with clock signals generated by said clock supply means, said control means operating to previously output and respectively set address generation rules to said plurality of address generation means so that the plurality of address generation means, set with the address generation rules, operate to generate an address in accordance with the set address generation rules outputted and respectively set by said control means to said plurality of address generation means, and in synchronism with the clock signals supplied from said clock signal supply means, independently of said control means, wherein the set address generation rules are maintained effective until they are reset by said control means.

2. A digital processor claimed in claim 1 wherein each one address generation means "ij" is connected to each one of the address ports "ij" in a one-to-one relation.

3. A digital process or claimed in claim 2 wherein at least one of the said arithmetic and logic units is configured to have at least one pipeline stage.

4. A digital processor claimed in claim 1 further including address arbitration means for receiving addresses generated by said plurality of address generation means, each of said address generation means for generating an address in accordance with the set address generation rules and in synchronism with the clock signals supplied from said clock signal supply means, said address arbitration means for supply said received addresses to at least one of said address ports "ij" in accordance with an address arbitration rule which is set by said control means and which is maintained effective until it is reset.

5. A digital processor claimed in claim 3 wherein said plurality of address generation means "ij" are configured to supply a read enable signal or a write enable signal to said address arbitration means, and wherein said address arbitration means supplies the read enable signal received or the write enable signal received to the at least one of said address ports in accordance with the preset address arbitration rule.

6. A digital processor claimed in claim 1 wherein said plurality of address generation means "ij" are configured to supply a read enable signal or a write enable signal to the memory "i".

7. A digital processor claimed in claim 1 wherein at least one of said arithmetic and logic units is configured to have at least one pipeline stage.

8. A digital processor according to claim 1, wherein said addresses are two-dimensional addresses and said two-dimensional addresses are autonomously generated by said plurality of address generation means.

9. A digital processor according to claim 1, wherein said addresses are two-dimensional addresses and said two-dimensional addresses are autonomously generated by said plurality of address generation means, wherein a processing is performed by said control means by controlling data in said memory group to flow through said memory group and outputs from said memory group to flow through said arithmetic and logic unit group and again through said memory group.

10. A digital processor according to claim 1, wherein a processing is performed by said control means by controlling outputs from said memory group to flow through said arithmetic and logic unit group, via said first arbitration means, and again to flow through the memory group, via said second arbitration means.

11. A digital processor according to claim 10, wherein a plurality of processing are simultaneously executed.

12. A method for controlling a digital processor, said digital processor comprising:

a memory group comprising "m" memories, each memory "i" (i=1 to "m") of said "m" memories having Pi address ports "ij" (j=1 to Pi), an arithmetic and logic unit group comprising "n" arithmetic and logic units, first arbitration means for receiving and arbitrating outputs of said memory group and for outputting the arbitrated outputs of said memory group to said arithmetic and logic unit group, second arbitration means for receiving and arbitrating outputs of said arithmetic and logic unit group and for outputting the arbitrated outputs of said arithmetic and logic unit group to said memory group, a plurality of address generation means each for supplying a generated address to said memory group, clock supply means for supplying respective clock signals to at least said plurality of address generation means, and control circuit for supplying control signals to said memory group, said arithmetic and logic unit, said first arbitration means and said second arbitration means, respectively, in synchronism with the clock signals generated by said clock supply means, said control means operating to previously output and respectively set address generation rules to said plurality of address generation means so that the plurality of address generation means, set with the address generation rules, operate to generate an address in accordance with the set address generation rules outputted and respectively set by said control means to said plurality of address generation means and in synchronism with the clock signals supplied from said clock signal supply means, independently of said control means, wherein the set address generation rules are maintained effective until they are reset by said control means, the method including the steps of:

selecting at least one of said plurality of address generation means, setting an address generation rule to each of the selected address generation means from said control means, supplying address generation start signals to said selected address generation means from said control means simultaneously or with a time difference so that each of said selected address generation means starts its address generation and continues to supply an address to a corresponding memory in synchronism with said clock signals and independently of said control means until the address generation indicated by the address generation rules is completed, each of said selected address generation means for generating an address generation end signal when an address generation is ended, and a selected one of address generation end signals generated by said selected address generation means being supplied to said control means.

13. A method claimed in claim 12 wherein each one address generation means "ij" is connected to each one of the address ports "ij" in a one-to-one relation.

14. A method claimed in claim 12 wherein said digital processor further includes address arbitration means for receiving addresses generated by said plurality of address generation means, each of said address generation means for generating an address in accordance with the set address generation rules and in synchronism with the clock signals supplied from said clock signal supply means, said address arbitration means for supplying said received addresses to at least one of said address ports "ij" in accordance with the address arbitration rule which is set by said control means and which is maintained effective until it is reset by said control means, wherein said address arbitration rule is set to said address arbitration means from said control means before said address generation rules are set, and each of said selected address generation means continues to supply an address to said address arbitration means in synchronism with said clock signals and independently of said control means until the address generation indicated by the address generation rules is completed, said address arbitration means continuing to supply the received addresses to the at least one of said address ports in accordance with the address arbitration rule which is set by said control means and which is maintained effective until it is reset by said control means.

15. A method claimed in claim 14 wherein said plurality of address generation means "ij" are configured to supply a read enable signal or a write enable signal to said address arbitration means, and wherein said address arbitration means supplies the read enable signal received or the write enable signal received to the at least one of said address ports in accordance with the preset address arbitration rule.

16. A method claimed in claim 14 wherein at least one of said arithmetic and logic units is configured to have at least one pipeline stage.

17. A method claimed in claim 12 wherein said plurality of address generation means "ij" are configured to supply a read enable signal or a write enable signal to the memory "i".

18. A method claimed in claim 12 wherein at least one of said arithmetic and logic units is configured to have at least one pipeline stage.

19. A method according to claim 8, wherein said addresses are two-dimensional addresses and said two-dimensional addresses are autonomously generated by said plurality of address generation means.

20. A method according to claim 8, wherein said addresses are two-dimensional addresses and said two-dimensional addresses are autonomously generated by said plurality of address generation means, said method further comprising performing a processing by controlling data in said memory group to flow through said memory group and outputs from said memory group to flow through said arithmetic and logic unit group and again through said memory group.

21. A method according to claim 8, further comprising performing a processing by controlling outputs from said memory group to flow through said arithmetic and logic unit group, via said first arbitration means, and again to flow through the memory group, via said second arbitration means.

22. A method according to claim 21, further comprising a step of simultaneously executing a plurality of processings.

* * * * *